United States Patent Office 3,466,243
Patented Sept. 9, 1969

3,466,243
ALLOYS FOR BEARINGS
Donald H. Buckley, North Olmsted, and Robert L. Johnson, Fairview Park, Ohio, assignors to the United States of America as represented by the Administrator of the National Aeronautics and Space Administration
No Drawing. Filed Nov. 29, 1965, Ser. No. 510,474
Int. Cl. C10m 5/28; C22b 23/00
U.S. Cl. 252—12                                          6 Claims

ABSTRACT OF THE DISCLOSURE

Metal alloys with hexagonal crystalline form for minimizing surface failures in mechanical components having static, sliding, or rolling contact. The lattice structure of the hexagonal metals is expanded to increase the crystal height.

---

The invention described herein was made by employees of the United States Government and may be manufactured and used by or for the Government for governmental purposes without the payment of any royalties thereon or therefor.

This invention is concerned with improved materials for mechanical components in static, sliding, or rolling contact. More particularly, the invention relates to metal alloy bearing materials for space applications.

Lubrication of mechanical components for space devices presents some difficult problems because of the lack of oxygen at the low ambient pressures of the environment of space. High friction, metal transfer, and complete welding of metal components in contact occur when the lubricants fail by lack of film strength, evaporation, decomposition, or wearing away.

In the past, the selection of bearing materials has been made on the basis of previous use, hardness characteristics, fatigue properties and success in the tool industry. Many conventional bearing, gear, and seal materials do not exhibit good friction and wear characteristics together with minimum welding tendencies in the absence of protective surface oxides or other surface reaction products and lubricating films.

Most bearing metals have cubic crystal structures. It has been found that crystal structure and crystalline phase changes of certain materials have a marked effect on the friction, wear, and metal transfer characteristics of materials in vacuum. Most metals having a close-packed hexagonal crystal form exhibit much better friction, wear, and metal transfer characteristics than the face-centered or body-centered cubic structures. Consequently, these materials are quite desirable for use in space lubrication systems. Materials having the lowest friction coefficients are those having the largest C-axis, or crystal height, and these materials are preferred for applications where low friction is of paramount consideration.

It is, therefore, an object of the present invention to provide improved materials for mechanical components in contact which minimize friction, wear and other forms of surface failure in static, sliding, or rolling contact.

Another object of the invention is to provide an improved alloy which utilizes elements to expand the lattice structure of hexagonal metals thereby increasing the crystal height to minimize friction, wear, and welding.

These and other objects and advantages of the invention will be apparent from the specification which follows.

To illustrate the beneficial technical effect of the present invention, friction data were obtained for two single crystals of cobalt sliding on polycrystalline cobalt. The polycrystalline cobalt was prepared by packing electrolytic cobalt chips into a zirconium oxide crucible heated in an induction vacuum furnace back-filled with dry argon. The cobalt was heated to a temperature of 2800° F., poured into a copper bowl, and cooled to room temperature.

Flat disc specimens from the resulting casting were machined to the required dimensions and surface finishes and then they were heat treated for twenty-four hours at 700° F. to minimize the concentration of face-centered form. This particular heat treatment was employed because the amount of face-centered-cubic structure that may be present at room temperature can vary from 5 to 30 volume percent depending on the thermal history of the material.

Rider specimens were prepared from single cobalt crystals. The flat disc and rider specimens were mounted in a vacuum chamber, and the disc specimen was driven through a magnetic drive coupling. The driver magnet was outside the vacuum system and was coupled to a hydraulic motor.

The rider specimen was supported in the specimen chamber by an arm that was gimbal mounted and bellows sealed through the chamber wall. A linkage at the end of the retaining arm, away from the rider specimen, was connected to a strain gauge assembly which was used to measure frictional forces. Load was applied through a dead weight loading system. Attached to the lower end of the specimen chamber was an ionization pump and a mechanical forepump with liquid nitrogen cold traps.

One rider specimen was oriented with the basal plane, or the 0001 plane, of the cobalt crystal parallel to the direction of sliding. The other rider specimen was oriented with one side face, or a $1\bar{1}00$ plane, parallel to the direction of sliding. The deviation was $\pm 2°$.

Both single crystals in the rider specimens were examined at a low speed of 4.5 feet per minute and at a light load of 250 grams. This was done to inhibit conversion to the polycrystalline state.

When the basal plane, or 0001 plane, was parallel to the direction of sliding, the final friction coefficient was lower than that obtained with the $1\bar{1}00$ plane, or prismatic (side face), parallel to the direction of sliding. Initially, the rider specimen having the 0001 basal plane parallel to the direction of sliding had a higher coefficient of friction, 0.6, than that of the $1\bar{1}00$ plane oriented crystal which was 0.3. However, after about 30 minutes the coefficient of friction for the 0001 plane oriented crystal stabilized at slightly less than 0.5 while the coefficient of friction for the $1\bar{1}00$ plane oriented crystal increased to about 0.9. The initially high friction for the 0001 plane oriented crystal and the initially low friction for the $1\bar{1}00$ oriented crystal was probably caused by deviations in the crystal orientations.

From the above tests it is evident that $C/a$ lattice parameter is important to the friction characteristics of the metal. The $C/a$ ratio is the ratio of the interbasal planar spacing to the atomic distance within the basal plane. Close-packed hexagonal metals with lattice dimensions giving $C/a$ ratios of 1.633 slip in compression along the basal plane, or 0001 plane. If the crystal dimensions are such that the $C/a$ ratio is less than 1.633, slip can occur along planes other than the 0001 basal plane. For example, slip may occur along the side face, or $1\bar{1}00$ plane, as in the previously described example.

In hexagonal close-packed metals having $C/a$ ratios of less than 1.633, the lattice is compressed along the C-axis which tends to make the basal planes less favorable for slip inasmuch as the compression reduced the inner planar spacing. For example, titanium is a metal with a $C/a$ ratio of less than 1.633, and with this metal slip occurs in the 1120 close-packed direction when the $10\bar{1}0$ plane is highly stressed. Slip planes for titanium are $10\bar{1}0$ and $10\bar{1}1$, and no matter how complex the deformation no slip occurs in the basal plane.

Metals such as magnesium and cobalt are, however, borderline cases with references to modes of slip. Both metals have $C/a$ ratios of 1.62 or very close to the normal 1.633 required for basal slip. These metals may, therefore, have one or two modes of slip. For magnesium basal slip appears almost exclusively at room temperature while at elevated temperatures both pyramidal and basal slip occur.

A similar mechanism prevails for cobalt with basal slip at room temperature. This is substantiated by the above experiment inasmuch as friction was lower for slip along the basal plane in the cobalt.

The load on both crystals was increased to a 1000 grams and friction data were obtained with the two single crystal orientations. With the increased load the friction coefficient decreased from both orientations. The basal slip orientation gave the lowest friction coefficient. With both loads a lower friction value was obtained with a single crystal oriented with the basal plane parallel to the direction of sliding than with the $1\bar{1}00$ plane oriented in the same direction.

From the above experiments, it is apparent that metals or alloys having hexagonal crystal forms which slip along the basal plane are desirable to minimize friction. It is likewise evident that hexagonal metals alloyed with elements which will maintain the hexagonal form of the base metal and inhibit the transformation of the hexagonal metal to other crystalline forms are desirable where friction is of prime consideration. For example, platinum alloyed with cobalt stabilizes the cobalt base metal in the hexagonal form. Also, titanium dioxide alloyed with titanium will stabilize the hexagonal crystal structure in the titanium.

It is further evident that alloying elements which expand the lattice in the C-axis direction thereby increasing the height of the crystal are beneficial because they promote slippage along the basal plane. Such alloying elements will increase the $C/a$ lattice parameter. By way of example, tin alloyed with titanium will expand the lattice ratio of the crystals. In the case of titanium-aluminum alloys, the $C/a$ lattice ratio is increased while the actual lattice spacings are decreased. This results in improved friction, wear and surface failure properties.

The use of certain alloying elements, such as tungsten, when added in sufficient quantity to the base metal, such as cobalt, will produce a multiphase system of intermetallic and a hexagonal solid solution. Such systems have greater hardness thereby reducing real contact area which is reflected in reduced friction, wear and surface failure.

In order to determine the influence of the crystal structure and orientation on the friction coefficient when a metal is sliding on the surface of a different metal, some friction and wear experiments were conducted with electrolytic cobalt prepared in the previously described manner sliding on 440-C stainless steel in vacuum. At low sliding velocities below 500 feet per minute, a hexagonal crystalline material, cobalt, was sliding on a body-centered-cubic structure, stainless steel. However, the data obtained from this experiment indicated that the friction coefficient was about the same as that from hexagonal cobalt sliding on hexagonal cobalt. A chemical analysis of the stainless steel disc surface upon the completion of the experiment revealed the presence of a transferred film of cobalt on this disc.

The friction data then at sliding velocities below 500 feet per minute reflected hexagonal cobalt sliding on a thin film of cobalt. At sliding velocities in excess of 500 feet per minute, a crystal transformation from hexagonal to cubic cobalt occurs as a result of temperature rise from frictional heating. Ultimately, face-centered-cubic cobalt sliding on body-centered-cubic 440-C stainless steel at 1000 feet per minute was obtained. The cobalt transfer film did not retain its continuity upon transformation of crystal structure in the rider specimen, and friction coefficients in excess of 1.0 were obtained.

Rider-wear rates were measured at two sliding velocities, 200 and 1000 feet per minute, to determine the influence of crystal transformation on wear. The rider-wear rate at 1000 feet per minute was nearly twice that obtained at 200 feet per minute. Although the wear rate at the high velocity was not as large as anticipated, appreciable metal transfer occurred at 1000 feet per minute with a continuous back and forth transfer of metal from the rider to the disc surface, which was not reflected in the wear value. A study of photomicrographs of the disc wear areas together with surface profile traces for the stainless steel surfaces indicated the presence of cobalt mass-transfer to the stainless steel surface at 1000 feet per minute, while a thin film transfer was indicated at a velocity of 200 feet per minute.

For comparison, friction data were also obtained for two metals with cubic structures sliding on 440-C stainless steel. These metals were iron and nickel. With the iron sliding on the stainless steel, the initial coefficient of friction of 0.7 increased to 1.4, at which time complete welding of the iron with the stainless steel disc occurred. An experiment with nickel was commenced at a higher sliding velocity because of the extreme difficulty encountered at lower speeds in obtaining representative friction values. At 200 feet per minute, however, a friction coefficient of 2.0 was measured, shortly after which complete welding of the rider and disc occurred.

When the specimens welded, the magnetic drive of the testing apparatus began slipping. The results from these tests indicated that close-packed hexagonal metal cobalt has superior friction properties in vacuum when sliding on 440-C stainless steel as compared with the cubic metals nickel and iron.

An alloy frequently used in bearing applications is identified as 52100. To gain some insight in the transformation behavior of cobalt sliding on an alloy other than 440-C stainless steel, some friction experiments were conducted for cobalt sliding on 52100 at various sliding velocities. The friction experiments were conducted both in air at 760 millimeters mercury and a vacuum of $10^{-9}$ mm. Hg.

In vacuum, the friction coefficient for cobalt sliding on 52100 at sliding velocities of 600 feet per minute and less was approximately 0.2. Chemical tests of the surface of the 52100 disc upon completion of the friction experiment revealed the presence of the cobalt transfer film on 52100. As in the case of 440-C stainless steel the sliding pair is essentially cobalt in its hexagonal form sliding on a thin cobalt transfer film. At a sliding velocity of 800 feet per minute, the friction coefficient increased to 0.95 with the assumed crystal transformation of cobalt to the face-centered-cubic form.

It is important to note that in the sliding velocity experiments in vacuum that the thermal conductivity of the disc material appeared to influence the rider specimens transformation. With cobalt sliding on cobalt, the friction increased at sliding velocities in excess of 1250 feet per minute. The 52100 and 440-C stainless steel disc material are poorer conductors than pure cobalt, and the transformation therefore occurs at lower sliding velocities because of the higher interface temperature.

To determine whether the crystal transformation of cobalt influenced the friction coefficient when transfer surface films previously formed in vacuum were present, friction data were obtained for cobalt sliding on 52100 in dry air. The 52100 specimens had been previously run in vacuum to enable a transfer film of cobalt to form. The coefficient of friction decreased with increasing sliding velocity while an increase in friction was observed in the same region of sliding velocity as noted in the vacuum experiment. Although the changes in friction properties in air were not marked, they did indicate the transformation of cobalt.

During the sliding of a metal on a metal in the absence of surface oxides strong adhesion between the two metal surfaces can occur. Cobalt in sliding contact with a nonmetal, aluminum oxide, was studied to ascertain the influence of a non-metal on the crystal transformation of cobalt. Friction data was obtained with a cobalt rider sliding on a solid aluminum oxide disc in vacuum. The data obtained did not reflect the crystal transformation of cobalt.

Aluminum oxide has a much lower thermal conductivity than that of 52100 and 440-C stainless steel. Because thermal conductivity of the disc surface exerts an influence on the sliding velocity at which transformation is observed, a change in friction should have been observed with aluminum oxide at a sliding velocity lower than that at which it occurred with the 52100 and 440-C stainless steel.

With metals sliding on metals, the strong bonds of adhesion associated with metal structures can develop. In aluminum oxide, which is thermodynamically stable, the aluminum metallic ion is surrounded by oxygen ions. As a result, the aluminum ions do not have the opportunity to form strong metal-to-metal bonds of adhesion with cobalt because they do not come into intimate contact. Thus, factors such as crystal structure, which may effect these bonds, have no influence with cobalt sliding on aluminum oxide; hence a change in friction with sliding velocities would not be expected to occur even though the transformation occurs.

Regarding the wear of aluminum oxide discs and rider specimens, examination of the disc specimen wear area revealed the presence of some transferred cobalt believed to be the result of mechanical transfer. The cobalt rider specimen exhibited large streamers of metal attached that formed during the course of sliding. These streamers, when examined microscopically at high magnifications, were revealed to have resulted from plastic flow of metal. They were not composed of discrete particles.

The above experiments illustrate an improved bearing material is provided by a metal having a hexagonal crystalline form. This material is especially useful when the transformation from the hexagonal form to the cubic form is inhibited by maintaining the sliding velocity below that at which transformation occurs or by selective alloying to increase the transformation temperature.

While it has been shown that where two mechanical elements are in bearing contact improved properties are obtained by using a metal having a hexagonal crystal form, it will be appreciated that various modifications can be made without departing from the spirit of the invention or the scope of the subjoined claims.

What is claimed is:
1. An improved bearing material comprising
a metal having a hexagonal crystalline form, and
an element alloyed with said metal for expanding the lattice structure of the said hexagonal crystalline form to increase the crystal interbasal plane spacing thereby minimizing friction, wear, and welding, said lattice structure being expanded to at least a $C/a$ ratio of 1.62.

2. In an apparatus of the type having members in sliding contact,
at least one of said members being a metal having a hexagonal crystalline form with a 1.62 minimum $C/a$ ratio at the point of contact with the other member, and
means for inhibiting the transformation of said hexagonal crystalline form to a cubic crystalline form thereby minimizing friction at the sliding contact.

3. Apparatus as claimed in claim 2 wherein the other member is a metal having a strong adhesion for the metal of the one member whereby a film of the metal of the one member is transferred to the other member so that said metal sliding on itself with the hexagonal crystals slipping along the basal planes.

4. Apparatus as claimed in claim 2 wherein said means comprises means for maintaining the temperature below that at which the crystal transformation from the hexagonal to the cubic form occurs.

5. A bearing matrial consisting essentially of a simple binary solid solution containing cobalt having a hexagonal crystalline form alloyed with a metal selected from the group consisting of tungsten and platinum thereby stabilizing said hexagonal crystalline form of the cobalt.

6. A bearing material consisting essentially of a simple binary solid solution containing titanium having a hexagonal crystalline form alloyed with a metal selected from the group consisting of tin and aluminum in an amount sufficient to expand the lattice ratio of the titanium.

References Cited

UNITED STATES PATENTS

| | | | |
|---|---|---|---|
| 2,797,996 | 7/1957 | Jaffee et al. | 75—175.5 |
| 3,091,022 | 5/1963 | Faulkner | 75—170 |
| 3,194,759 | 7/1965 | Devine et al. | 252—12 |
| 2,980,475 | 4/1961 | Wolfe | 252—25 |
| 3,239,288 | 3/1966 | Campbell et al. | 252—26 |

OTHER REFERENCES

"Motor Oils and Engine Lubrication," by Georgi Reinhold Pub. Corp., New York, 1950, p. 386.

DANIEL E. WYMAN, Primary Examiner

I. VAUGHN, Assistant Examiner

U.S. Cl. X.R.

75—82, 170, 175.5; 308—241